United States Patent [19]

Born et al.

[11] Patent Number: 4,870,543

[45] Date of Patent: Sep. 26, 1989

[54] EXTENSIBLE SAFETY LIGHT

[75] Inventors: Robert L. Born; Leroy C. Born, both of Corona, Calif.

[73] Assignee: Robert L. Horton, Marina Del Rey, Calif.

[21] Appl. No.: 261,631

[22] Filed: Oct. 24, 1988

[51] Int. Cl.[4] .............................................. B60Q 1/52
[52] U.S. Cl. ...................................... 362/61; 362/74; 362/198; 362/285; 362/418; 340/471
[58] Field of Search ................... 362/61, 74, 157, 285, 362/407, 418, 431, 198; 340/84, 87, 90

[56] References Cited

U.S. PATENT DOCUMENTS

| | | | |
|---|---|---|---|
| 1,398,011 | 11/1921 | Errington | 340/90 |
| 1,977,356 | 10/1934 | Schmid | 340/90 |
| 2,861,174 | 11/1958 | Talbot et al. | 340/90 |
| 3,143,722 | 8/1964 | Murch | 340/87 |
| 3,473,148 | 10/1969 | Koenig | 340/91 |
| 3,579,184 | 5/1971 | Forestal | 340/87 |
| 3,696,334 | 10/1972 | Demeter | 340/87 |
| 4,051,361 | 9/1977 | Lichen et al. | 340/87 |
| 4,300,186 | 11/1981 | Hurd | 362/66 |
| 4,381,534 | 4/1983 | Sakurai | 362/403 |
| 4,613,847 | 9/1986 | Scolari et al. | 348/90 |
| 4,633,215 | 12/1986 | Anders et al. | 340/90 |

Primary Examiner—Ira S. Lazarus
Assistant Examiner—Richard R. Cole
Attorney, Agent, or Firm—William H. Maxwell

[57] ABSTRACT

A safety light with a base and magnetic attachment to a vehicle and a collapsible support carrying a high intensity light source energized by a capacitor discharge circuit and a conductor storage in the base passing to the light source when extended from the base by the support.

6 Claims, 2 Drawing Sheets

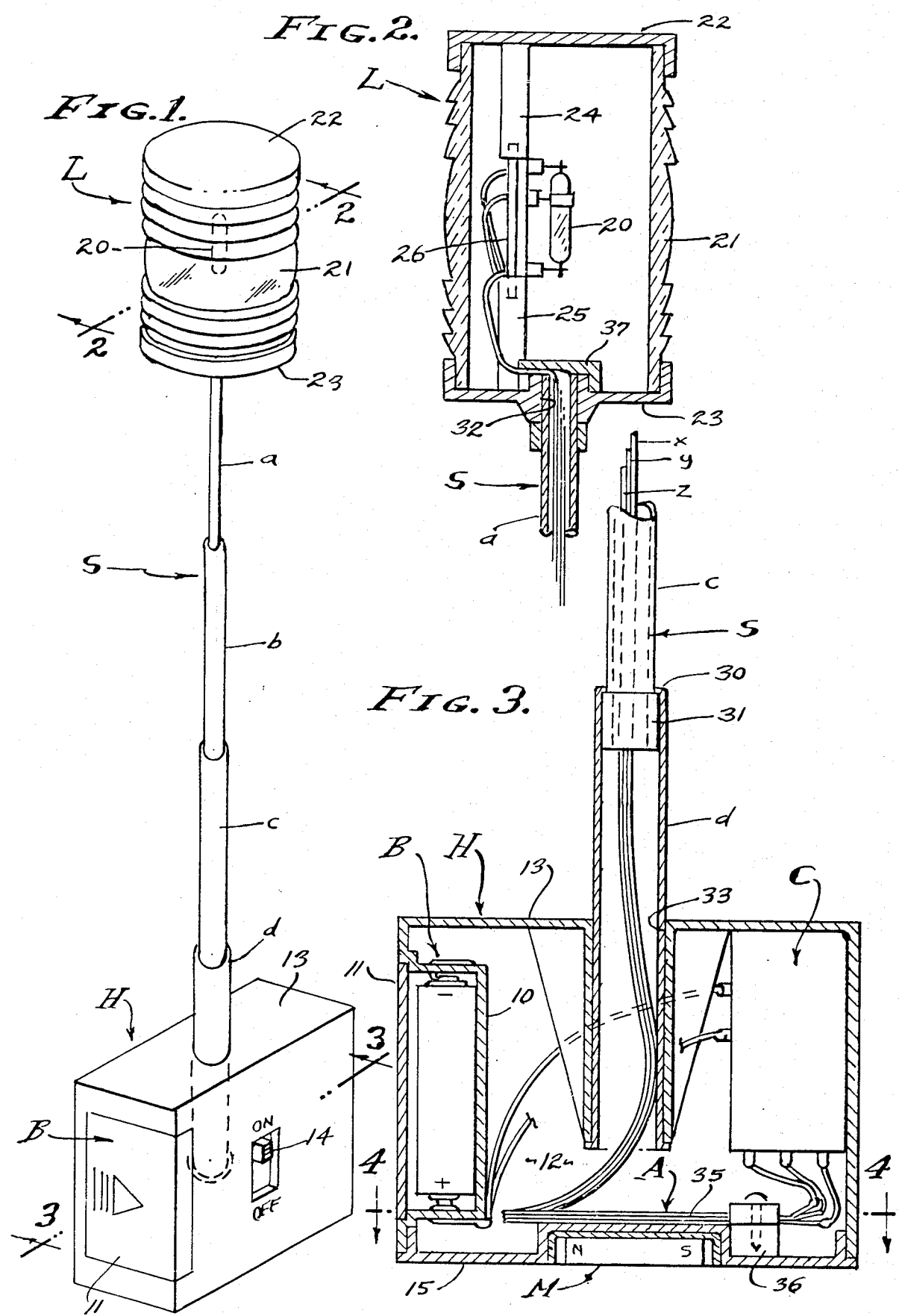

EXTENSIBLE SAFETY LIGHT

BACKGROUND OF THE INVENTION

This invention relates to safety lighting, especially for road or highway conditions when a vehicle emergency exists. Heretofore, high intensity lights have been employed for this purpose, but often inadequate for want of visibility. That is, such emergency lights are most often obscured because of their location and interference by objects between said light and those persons sought to be warned, for example of impending danger. It is auto accidents and emergencies which are of concern, when an auto is wrecked or stalled in a dangerous situation to oncoming traffic. Therefore, it is a general object of this invention to provide an extensible light for attachment to a vehicle wrecked or stalled and stopped along a road or highway in a dangerous situation. With the present invention, the light source is mounted and extended from the vehicle in order to avoid obscurity, which otherwise results when such a light is closely attached to the vehicle.

High intensity halogen strobe lights are widely used as warning lights, instantaneously energized at uniform time intervals by a battery powered capacitor discharge circuit. Such lights are self contained within a housing provided with mounting means in the form of a magnet to be applied to a steel body part of the vehicle, and with a lens to be faced in the direction of oncoming traffic. An ON-OFF switch provides control over its use. It is an object of this invention, therefore, to employ the aforesaid self contained battery powered intermittent discharge circuitry and switch control, in combination with an extensible light source, for compact storage and most importantly for extensibility in order to avoid its obscurity.

An object of this invention is to provide an omnidirectional light source which need not be aimed in the direction of oncoming traffic. With the present invention, a circular Fresnel lens surrounds the light per se that is intermittently energized. Accordingly, the light souce can be viewed from any approach to the scene involved.

It is another object of this invention to provide for said extensibility of the light source by the use of a telscoping support of tube formation that carries the electrical conductors necessary for operation of a high intensity strobe light of the type under consideration. As disclosed herein, the strobe light is a halogen light that requires three conductors, all of which must be extended along with extension of the light source from the mounted base or housing that is attached to the vehicle body. The extending tubular telescoping members withdraw the conductors from the base or housing, and conversely return the conductors into the base or housing.

It is still another object of this invention to provide conductor storage and supply means, which enables withdrawal and return of the conductors from and into the base or housing. In practice, there are three conductors of spring material coiled loosely in the base or housing and entered into the telescoping members to emanate into the light source for its energization. As will be described, the coiled conductors are anchored at their one ends in the base or housing and connected to the controlling circuit means, and they are carried upwardly and downwardly at their other ends by the inner tubular telescoping member.

The foregoing and various other objects and features of this invention will be apparent and fully understood from the following detailed description of the typcal preferred form and application thereof, throughout which description reference is made to the accompanying drawings.

THE DRAWINGS

FIG. 1 is a perspective view of the safety light in its extended condition.

FIG. 2 is an enlarged sectional view of the light source taken as indicated by line 2—2 in FIG. 1.

FIG. 3 is an enlarged sectional view of the base-housing taken as indicated by lines 3—3 on FIG. 1.

Figure 6:
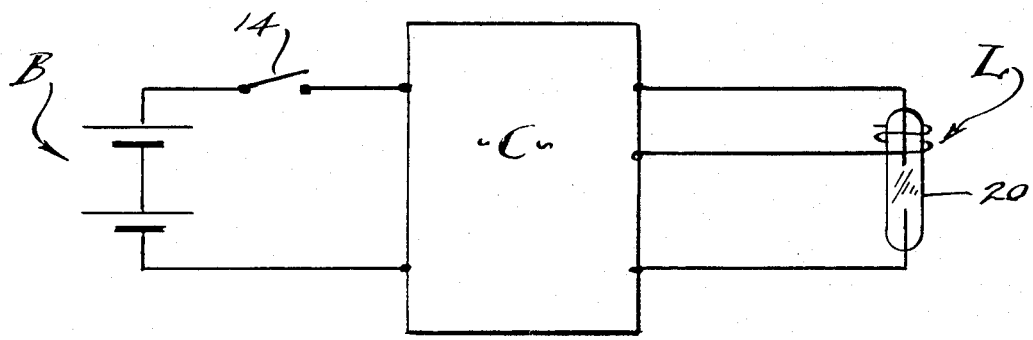

And, FIG. 6 is a schematic diagram of the controlling circuit means that implements operation of the light source.

PREFERRED EMBODIMENT

Referring now to the drawings, this Extensible Safety Light includes generally, a base-housing H incorporating a mounting means M and containing an energy circuit means C and switch controlled battery power supply B, and a light source L extensibly supported from the base-housing by a collapsible support S, there being at least one extensible conductor and preferably three of the same extending from the base-housing to the light source and characterized by a conductor storage and supply means A.

The base-housing H is a box-like structure, preferably of molded plastic, having a battery receiver 10 closed by a removable cover 11, to contain two batteries of the power supply B, providing 3 volts. The receiver is at one end of the elongated housing, the energizing circuit means C being at the other end of the base-housing, leaving achamber 12 therebetween. The collapsible support S is carried centrally of the base-housing and enters the chamber 12 through a top 13 thereof. The front side of the base-housing carries an ON-OFF switch 14 to the energizing circuit means C. Access to the base-housing chamber 12 is via a removable bottom 15 which incorporates a magnet mounting means M recessed to be exposed flush at the bottom plane, for attachment to a steel body part of a vehicle (not shown).

The energizing circuit means C is a state of the art circuit of the capacitor discharge type, timed to instantaneously release stepped up voltage through a transformer at intervals of time. Three conductors to a halogen lamp 20 momentarily energizes the same to emit high intensity light (see FIG. 6).

The light source L is carried by the collapsible support S, and is an omnidirectional light source from which light is emitted horizontally in all directions from the lamp 20. In practice, the light source L involves a cylindrical Fresnel lens 21 that surrounds the lamp 20 and through which the light therefrom is concentrated, generally at least in said horizontal plane. As shown, the lens cylinder is closed by top and bottom ends 22 and 23, which have posts 24 and 25 that carry the base 26 of the lamp 20 (see FIG. 2). It is preferred that parts 21-25 are of molded plastic, the lens being an acrylic of amber (or other color such as red) coloration. The axis of the lens cylinder is vertical or substantially so as shown.

The collapsible support S can vary in type and construction, and is essentially an extensible support means carried by the base-housing H and supporting the light source L with its high intensity lamp 20. The collapsible support S is preferably a multiplicity of telescoping tube members, four such members a, b, c and d being shown. These tube members can be of metal as indicated, or they can be made of plastic with a heavier cross section as may be required. State of the art construction can be used in the telescoped arrangement of member a - d, each successively higher extension being of a smaller diameter to slide within the next lower member. In order to prevent separation of said member a - d, a stop 30 on an outer member engages with a slide 31 on an inner member, when the inner member is extended (see FIG. 3). It is to be understood that the design of this telescoping support can be varied as circumstances require. However, it is significant that the tubular members pass the extended conductors from the storage and supply means A, that the outermost tube member d is carried by the top 13 of the base-housing H, and that the innermost tube member a carries the light source L. The member a and d are pressed or bonded into respective openings 32 and 33 in the light source end 23 and base-housing top 13.

Figure 4:
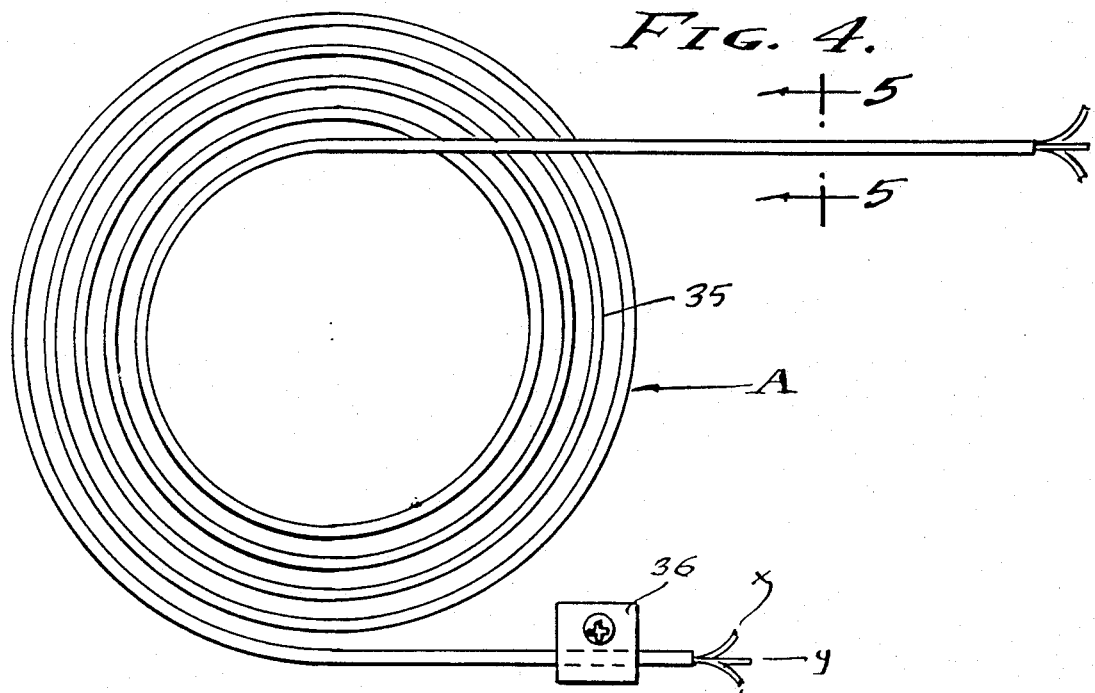
FIG. 4 is an enlarged plan view of the conductors embodying the supply means therefore and taken as indicated by line 4—4 on FIG. 3.
Figure 5:
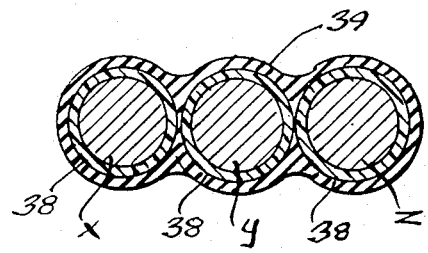
FIG. 5 is an enlarged detailed section through three conductors and taken as indicated by line 5—5 on FIG. 4.

Referring now to the conductor storage and supply means A, there is at least one conductor and preferably three conductors x, y and z as as shown in FIG. 5 and throughout the drawings. In accordance with this invention the conductors x, y and z are embodied in the means A in the form of a flat coil 35 thereof, as best illustrated in FIG. 4 of the drawings. The coil 35 is essentially convolute, however the whorls thereof are radially separated to avoid interference therebetween. The outermost whorl is extended tangentially a short distance and secured by an anchor 36 to the case-housing (see FIG. 3). The innermost whorl is substantially extended tangentially by turning it upward as shown in FIG. 3 to enter the tube member a - d, where its extended end is secured by a cap 37 to enter into the light source cylinder lens 21. Conductor leads extend to the lamp 20 as shown.

A feature of this invention is the resilience of conductors x, y and z made of spring material such as piano wire, or preferably electrically conductive material such as spring brass, or phosphor bronze, or beryllium copper, or the like. As shown in FIG. 5, the conductors x, y and z are insulated one from the other by dielectric coatings 38 such as a varnish or the like, and they are bonded together by an envelope or an adhesive layer 39 or the like. In practice, the conductors are arranged one over the other in a flat formation when formed into the coil 35, as clearly shown in FIGS. 3, 4 and 5. Four or five whorls (turns) are sufficient to attain a twenty four to thirty six inch extension, with whorls of approximately two inch diameter.

It will be seen that this safety light can be collapsed and stored in a small space, and that it can be easily and quickly extended to position the light source well above the vehicle body to which the base-housing is attached by the magnet means. When switched ON, the high intensity halogen strobe lamp emits light through the omni-directional Fresnel lens, for alerting oncoming traffic in all directions. Obscurity is almost if not entirely eliminated under ordinary circumstances.

Having described only the typical preferred form and application of our invention, we do not wish to be limited or restricted to the specific details herein set forth, but wish to reserve to ourselves any modifications or variations that may appear to those skilled in the art, as se forth within the limits of the following claims.

We claim:

1. An extensible safety light for attachment to vehicle bodies and the like, to warn on coming traffic of impending danger, and including;

a base-housing having a top and a bottom and with a chamber herein, there being means at said bottom for attachment to the vehicle body, a light source to be extended from the top of the base-housing, a collapsible tubular support means for the light source and opening from the chamber of the base housing and to the light source, and a conductor storage and supply means within the chamber and with at least one conductor and comprised of a flat convolute coil of a spring material with whorls thereof separated to avoid interference therebetween and emanating from the chamber and top of the base-housing and through the collapsible support means to the light source, there being energizing circuit means connected to the conductor storage and supply means to energize the light source.

2. The extensible safety light as set forth in claim 1, wherein an inner of the convolute coil is anchored to the light source.

3. The extensible safety light as set forth in claim 1, wherein an outer whorl of the convolute coil is anchored within the chamber of the base-housing.

4. The extensible safet light as set forth in claim 1, wherein the convolute coil of the conductor storage and supply means is comprised of spring material.

5. The extensible safety light as set forth in claim 1, wherein the light source has multi-contacts, and wherein the conductor storage and supply means includes a multiplicity of said at least one conductor secured together one above the other in flat convolute formation to form said coil thereof and connected to said contacts of the light source.

6. The extensible safety light as set forth in claim 1, wherein the collapsible tubular support means is a telescoping support of slidable tubular members opening from the base-housing chamber and into the light source and passing the at least one conductor of the conductor storage and supply means, and wherein the light source has multi contacts and the conductor storage and supply means is comprised of a flat convolute coil of spring material comprising the at least one conductor with whorls thereof separated to avoid interference therebetween and includes a multiplicity of said at least one conductor secured together one above the other in said flat formation to form said coil thereof and with an outer whorl thereof anchored within the chamber of the base-housing and an inner whorl thereof tured upwardly and through the tubular support means and connected to said contacts of the light source.

* * * * *